F. B. MORSE.
Tire-Tightener.
No. 60,639.
Patented Dec. 18, 1866.
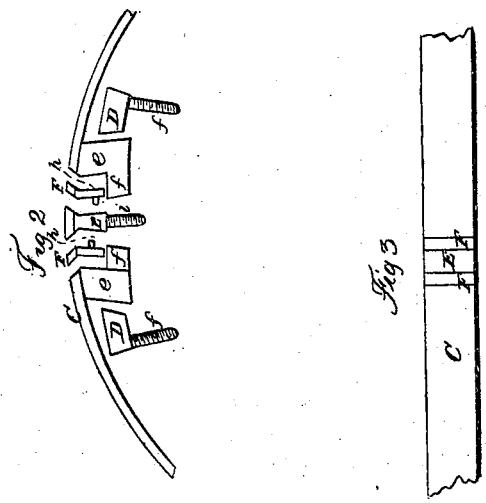
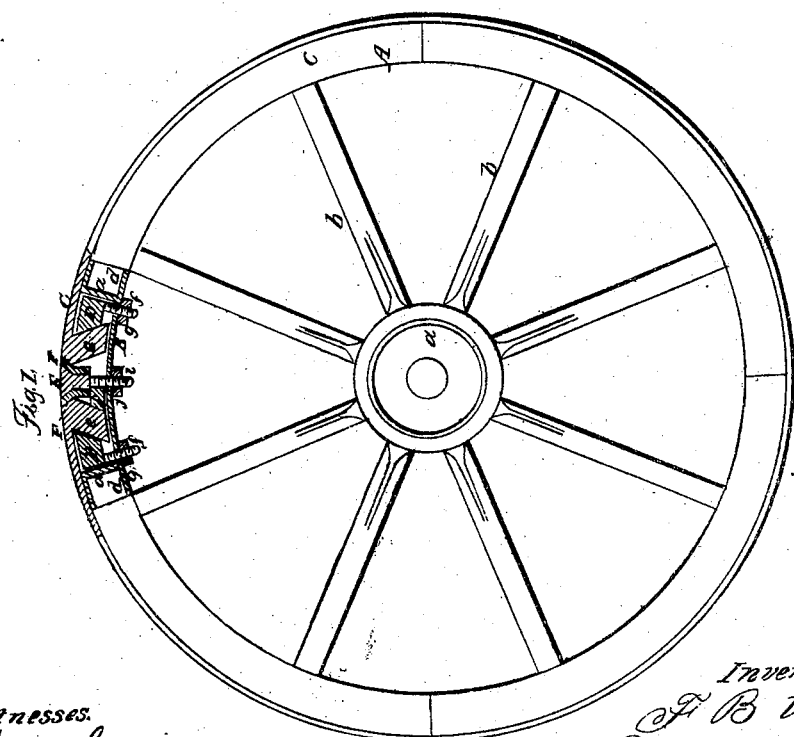
Witnesses.
Inventor:

United States Patent Office.

IMPROVEMENT IN TIGHTENING THE TIRES OF WHEELS.

F. B. MORSE, OF MILWAUKEE, WISCONSIN.

Letters Patent No. 60,639, dated December 18, 1866.

---

*The Schedule referred to in these Letters Patent and making part of the same.*

---

TO ALL WHOM IT MAY CONCERN:

Be it known that I, F. B. MORSE, of Milwaukee, in the county of Milwaukee, and State of Wisconsin, have invented a new and improved Means for Tightening Tires on Wheels; and I do hereby declare that the following is a full, clear, and exact description thereof, which will enable those skilled in the art to make and use the same, reference being had to the accompanying drawings, forming part of this specification, in which—

Figure 1 is a side or face view of a wheel with a tire applied to it provided with my improvement.

Figure 2, a detached view of a portion of a tire, with its tightening parts all disconnected.

Figure 3, a detached outer or exterior view of the ends or joint of the tire connected together.

Similar letters of reference indicate corresponding parts.

The object of this invention is to obtain a simple means whereby tires may be tightened on wheels at any time when they become loose, without the aid of a smith or mechanic, and by an extremely simple and efficient arrangement of parts.

A represents a wheel which may be constructed in the usual manner, $a$ being the hub, $b$ the spokes, and $c$ the felloes thereof. B is a socket, which may be of malleable cast iron or other suitable metal. This socket is of segment form, corresponding to the curvature of the felloes of the wheel, and it is provided with two partitions or abutments, $a\ a$, which have a radial position relatively with the wheel, and form chambers to receive the ends of two of the felloes, $c$, of the wheel, the ends of the felloes which are fitted into said chambers being made in tenon form, as shown at $d$, so that the exterior of the socket will be flush with the felloes, (see fig. 1,) and the ends of the felloes abut against the partitions $a\ a$. The space between the partitions $a\ a$ is open at the top or exterior of the socket, but closed at the inner side to receive lips, $e\ e$, which are formed at the ends of the tire C. These lips, $e\ e$, project inward from the ends of the tire in an oblique direction, the space between them increasing in width from their outer to their inner ends, the front and rear sides being parallel with each other. The inner end of each lip, $e$, has an arm, $f$, projecting from it in a direction longitudinal with the socket B, the arms of the two lips projecting towards each other, but from opposite sides of the lips. D D represent keys which are fitted in the central compartment of the socket, one behind each lip $e$. The sides of these keys, opposite or adjoining the partitions $a\ a$, are parallel with them; but the opposite sides are inclined or oblique, and are parallel with the adjoining sides of the lips $e\ e$. Each key, D, has a screw-tang, $f$, projecting from it, and these tangs extend through the inner side of the socket B, and have nuts, $g$, on them, as shown in fig. 1. E represents a key, the sides of which are of double inclined form, or of V-shape, and F F are two keys, which correspond in form to the sides of the key E, and are placed one at each side of it, the lower part of each key, F, being provided with a lateral pin, $h$, to fit into a recess in key E. (See fig. 2.) The lower outer surfaces of the keys F are vertical, but the outer surfaces of the upper parts are inclined, flare outward, and correspond to the ends of the tire C, which are bevelled to correspond to them. (See fig. 1.) The key E is provided with a screw-tang, $i$, which extends through the inner side of the socket B, and has a nut, $j$, upon it and the arms, $f$, of the lips $e\ e$ extend under the shoulders formed by the junction of the tang $i$ with the lower end of key E. The tire C, when first applied to the wheel, is heated and adjusted tightly on the wheel A in the usual manner, the keys D D E F F, all being in the position as shown in fig. 1, and the outer surfaces of the keys E F F flush with the outer surface or tread of the tire. In case of the tire becoming loose by the shrinking of the wheel or other causes, the nut $j$ of the tang $i$ is relaxed, and one of the keys F removed and the keys D D secured down by turning the nuts $g$, the inclined sides of the keys D acting against the rear inclined sides of the lips $e$, and drawing the ends of the tire C close, one to the remaining key F and the other to the key E. The arms $f$ of the lips $e$ prevent the ends of the tire being forced outward under the action of the keys D D. In case the removal of one key, F, is not sufficient, both keys may be withdrawn. Any number of keys, F, may be used as desired, one or more being placed at each side of key E, and in cases where the tire is but slightly loose it may be tightened sufficiently by screwing down the keys D D without withdrawing either key F, the ends of the tire extending under or within the outer ends of the keys F F. The arrangement is extremely simple and efficient, and any one with a proper wrench may tighten the tire at any time, and without any difficulty whatever.

Having thus described my invention, I claim as new, and desire to secure by Letters Patent—

1. The lips $e\ e$ at the ends of the tire C, in combination with the keys D D E, operated through the medium of screws, and one or more removable or adjustable keys F, all arranged substantially as and for the purpose set forth.

2. The arms $f\ f$ on the lips $e$, in combination with the keys E D D, substantially as and for the purpose specified.

3. The socket B provided with the partitions $a\ a$ to form two end partitions to receive the ends of the felloes, and a central compartment to receive the tire-tightening mechanism, substantially as and for the purpose specified.

F. B. MORSE.

Witnesses:
WM. F. MCNAMARA,
ALEX. F. ROBERTS.